March 3, 1959
D. SAMIRAN
2,875,494
QUICK DISCONNECT FASTENER
Filed June 20, 1955
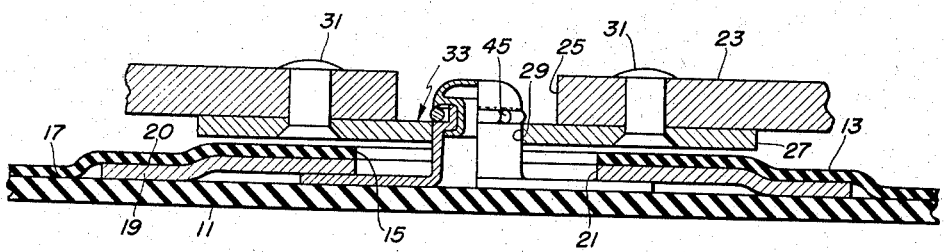
FIG. 1
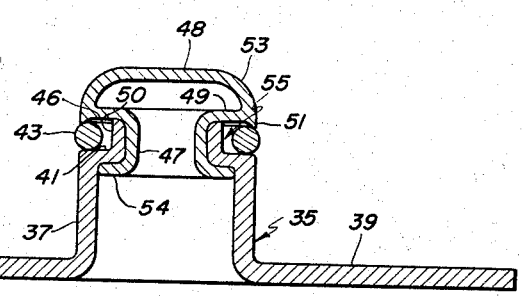
FIG. 2
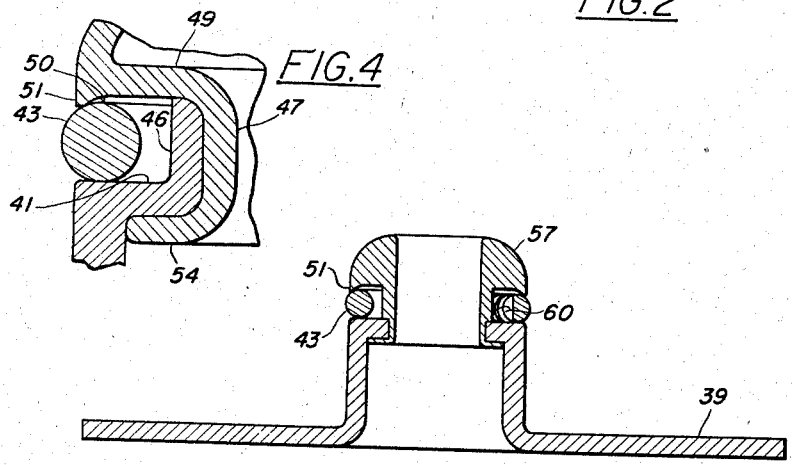
FIG. 4
FIG. 3
INVENTOR.
DAVID SAMIRAN
BY
*Albert L. Jaffers*
ATTORNEY

United States Patent Office 2,875,494
Patented Mar. 3, 1959

2,875,494
QUICK DISCONNECT FASTENER

David Samiran, East Cleveland, Ohio

Application June 20, 1955, Serial No. 516,404

2 Claims. (Cl. 24—215)

This invention relates to a quick disconnect fastener and more particularly to a fastener for securing a removable gasoline tank to the frame of an airplane.

It is a general object of the present invention to provide holding means for a rubber gasoline tank which may be easily and quickly mounted or dismounted in an airplane wing.

A primary object of the invention is the provision of an improved fastener device for mounting a rubber gasoline tank in an airplane wing whereby uniform fueling of the tank is made possible.

An important object of the invention is to provide a fastener with a self-centering split spring ring which cannot be sheared off.

A further object of the invention is the provision of an improved fastener which is light in weight.

A salient object of this inventtion is the provision of a quick disconnect fastener which will be sturdy and durable in construction, reliable and efficient in operation, relatively simple and inexpensive to manufacture and which will withstand a pull of approximately 41 to 45 pounds.

Other objects and features will in part be obvious, and in part be pointed out as the description of the invention proceeds, and shown in the accompanying drawing, wherein there is disclosed a preferred embodiment of this inventive concept.

In the drawings:

Figure 1 is an elevation with parts broken away showing the fastener holding a portion of a gasoline tank to the frame of an airplane wing.

Figure 2 is a cross sectional view of the fastener illustrated in Figure 1.

Figure 3 is a cross sectional view showing a modification of the fastener.

Figure 4 is a fragmentary elevational view showing the ring mounted in the groove.

Referring to the drawings in detail, the numeral 11 designates a flexible gasoline tank provided with a rubber retainer 13 having an opening 15 and secured to the tank 17 by cement or other conventional means. Mounted within the retainer in a dish-shaped disk 19 having a central aperture 21 and fastened to the retainer at 20 by cement or other conventional material.

The aircraft frame 23 is provided with an opening 25 and a disk or support 27 having an aperture 29 is mounted on the frame by rivets 31 to provide the female section 33 of the fastener.

As shown in Figure 2, the male section 35 of the fastener has a base or body portion 37 with an out-turned flange 39 at one end. The other end of the body portion 37 is provided with an in-turned shoulder 41 which functions as a bearing for the spring ring 43 which is split at 45 to form a gap. The shoulder 41 terminates in an upturned portion 46.

The nose or dished head portion 48 has a neck or body 47 with an outward portion 49 having a downwardly projection or jaw 51. The jaw 51 forms a curved surface 50 which is substantially on an arch two-thirds of the diameter of the ring 43. This curved surface functions to prevent the ring from sticking in the groove or behind the jaw when the ring is compressed. The top of the head portion is curved or cammed at 53 to aid in the alignment of the male section with the female section.

The head portion is assembled or connected to the body 37 by spinning one end of the neck at 54.

The operation and use of the fastener will be readily appreciated. The male part 35 is secured to the gasoline tank 11 and is free to float between the disk 19 and tank which permits adjustment to align the male section 35 with the female section 33. When the sections are in alignment, pressure is exerted on the male section, and the ring is compressed within the groove 55 until the ring passes through the opening 29 and assumes the position illustrated in Figure 1. The expansion of the ring enables the sections to be held together until sufficient tension is exerted to part them. It should be noted that in some instances as the spring is inserted into the female section more pressure may be asserted on one side of the ring than on the other, in which event the jaw 51 which is spaced from the shoulder 41 functions to hold the ring within the circumferential groove 55, thus eliminating the danger of the ring being sheared.

The primary difference between the fastener illustrated in Figure 3 and the fastener illustrated in Figures 1 and 2 is in the construction of head portion 57 which is of solid construction and is made by a screw machine. The solid head construction is used for smaller fasteners where stamping would not be feasible. If desired, the ring 43 could be provided with a series of weakening grooves or slots 60 on the inner periphery.

Since many embodiments may be made of this invention, and as many modifications may be made in the quick disconnect fastener as shown and described, it is to be understood that all matter herein is to be interpreted merely as illustrative and not in a limiting manner.

I claim:

1. A quick disconnect fastener comprising, in combination, a male section having a body portion with an outwardly-turned flange at one end, said body provided with an inwardly-turned portion adapted to serve as a bearing surface at the other end, a dished head portion having a downwardly-turned circumferential jaw, said dished head being hollow and having a neck with a portion adapted to be disposed under said bearing surface so that the head portion and body portion are fastened together to form a circumferential recess, a split ring mounted in the recess, said jaw having full circumferential contact with said ring whereby the ring is centered and retained within the recess so that a positive alignment with a female member can be maintained.

2. A quick disconnect fastener comprising, in combination, a male section having a body portion with an outwardly-turned flange at one end, said body provided with an inwardly-turned portion adapted to serve as a bearing surface at the other end, a dished head member having its periphery turned downwardly to form a retaining jaw, said head member being hollow and having a neck portion provided with an outwardly-turned flange adapted to be disposed under said bearing surface so that the head member and body portion are fastened together to form a circumferential recess, a split ring mounted in the recess with a small portion thereof extending beyond said jaw, said retaining jaw having full circumferential contact with said ring whereby the ring is centered within the recess and retained therein so that a positive alignment with a female member can be maintained.

References Cited in the file of this patent

UNITED STATES PATENTS

| | | |
|---|---|---|
| 574,265 | Pringle | Dec. 29, 1896 |
| 1,196,757 | Bennett | Sept. 5, 1916 |
| 1,376,389 | Holmes | Apr. 26, 1921 |
| 1,454,890 | Harpe | May 15, 1923 |